March 10, 1964  H. W. WESTEREN ETAL  3,124,634
FURNACE CONSTRUCTION
Filed May 21, 1962  6 Sheets-Sheet 1

INVENTORS.
Herbert W. Westeren
Stewart B. Ashton
BY
Salter + Michaelson
Attorneys.

March 10, 1964 H. W. WESTEREN ETAL 3,124,634
FURNACE CONSTRUCTION
Filed May 21, 1962 6 Sheets-Sheet 4

INVENTORS.
Herbert W. Westeren
Stewart B. Ashton
BY
Salter + Michaelson
Attorneys.

March 10, 1964   H. W. WESTEREN ETAL   3,124,634
FURNACE CONSTRUCTION
Filed May 21, 1962   6 Sheets-Sheet 6

INVENTORS.
Herbert W. Westeren
Stewart B. Ashton
BY
Salter + Michaelson
Attorneys.

United States Patent Office 3,124,634
Patented Mar. 10, 1964

3,124,634
FURNACE CONSTRUCTION
Herbert W. Westeren, Barrington, and Stewart B. Ashton, Greenville, R.I., assignors to C. I. Hayes, Inc., Cranston, R.I., a corporation of Rhode Island
Filed May 21, 1962, Ser. No. 196,100
15 Claims. (Cl. 13—31)

The present invention relates to a furnace construction. More particularly, the present invention relates to a high-temperature, high vacuum furnace of the elevator type wherein means are provided for sealing communication between the heat chamber of the furnace and the remaining portion thereof when a work piece has been removed from the heat chamber, the interior conditions in the heat chamber thereby being substantially maintained prior to the introduction of a new work piece therein.

The furnace construction embodied in the present invention is adapted to heat treat a metal work piece at a relatively high temperature in the range of 4500 to 5000° F. and at a vacuum pressure in the range of 10–4 mm. Hg. Since relatively high temperatures are utilized during the heat treatment process and the heat chamber of the furnace construction is maintained under a vacuum, it is desirable to substantially retain the interior conditions of the heat chamber after the work piece has been removed therefrom and prior to the insertion of a new work piece therein. It is also desirable to maintain the operating elements of the furnace construction at a safe temperature level and for this purpose a cooling system is provided that continuously circulates a cooling medium therethrough.

The furnace construction embodied herein is of the elevator type and includes a work platform that is adapted to be moved through a gate assembly that controls access to the heat chamber. Upon withdrawal of the work piece from the heat chamber through the gate assembly, it is desirable to seal the gate assembly, and for this purpose a unique door assembly is provided that is movable by a linkage system into sealing communication with the gate assembly. Since the door assembly is located in close proximity to the heat chamber in the sealing position thereof, the effective cooling thereof is required, and a novel cooling system is provided that includes means for introducing the cooling medium into the door assembly by way of the structure that is employed for pivoting the door assembly to and from its sealing position.

When the door assembly is moved into sealing engagement with the heat chamber gate assembly, an O-ring that is secured thereto insures that the proper sealing engagement is effected. After the door assembly has been removed from engagement with the gate assembly, it is necessary to protect the O-ring from the heat emanating from the heat chamber, and for this purpose a pivotally mounted shield is provided that is operatively connected to the linkage system that controls movement of the door assembly. Thus, upon retraction of the sealing device from the sealing position thereof, the shield is moved into shielding relation with respect to the O-ring and protects the O-ring from the high temperatures radiating from the heat chamber.

Accordingly, it is an object of the present invention to provide a high-temperature, high-vacuum furnace for use in the heat treatment of metal materials.

Another object of the present invention is to provide a furnace construction that includes a work transfer chamber and a heat chamber, the heat chamber being effectively sealed from the work transfer chamber when a work piece is not located in the heat chamber.

Still another object is to provide a sealing device for use in a high temperature furnace that is adapted to seal communication between a heat chamber and a work transfer chamber, the sealing device having a cooling medium continuously circulating therein and being movable to and from the sealing position by a unique linkage and pivot assembly.

Still another object is to provide a furnace construction in which a gate assembly is provided for separating a heat chamber and a work transfer chamber, the gate assembly having an aperture formed therein that is adapted to be sealed by a door assembly when a work piece is not located in the heat chamber.

Still another object is to provide a linkage and pivot construction for use with a door construction that is adapted to move the door construction to a sealing position fo rsealing communication between a heat chamber and a work transfer chamber.

Still another object is to provide a cooling system for use in a high-temperature, high-vacuum furnace that is adapted to circulate a cooling medium through the component parts of the furnace.

Still another object is to provide a bearing and gland assembly for a pivot and linkage assembly that is associated with a door construction in a furnace, the bearing and gland assembly being adapted to effectively seal a pivot rod and a linkage arm in the housing of the furnace so that a cooling medium may be continuously circulated therethrough.

Still another object is to provide a system for insuring proper location of the work platform in the heat chamber regardless of external influences on the air motor used for controlling movement of the work platform.

Other objects, features and advantages of the invention will become apparent as the description thereof proceeds when considered in connection with the accompanying illustrative drawings.

In the drawings which illustrate the best mode presently contemplated for carrying out the present invention:

Figure 3:
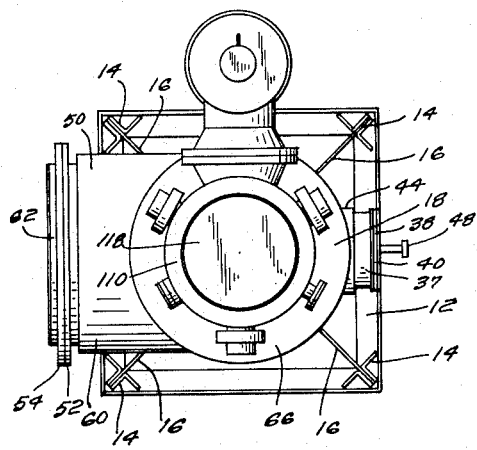
FIG. 3 is a top plan view of the furnace construction shown in FIGS. 1 and 2.
Figure 1:
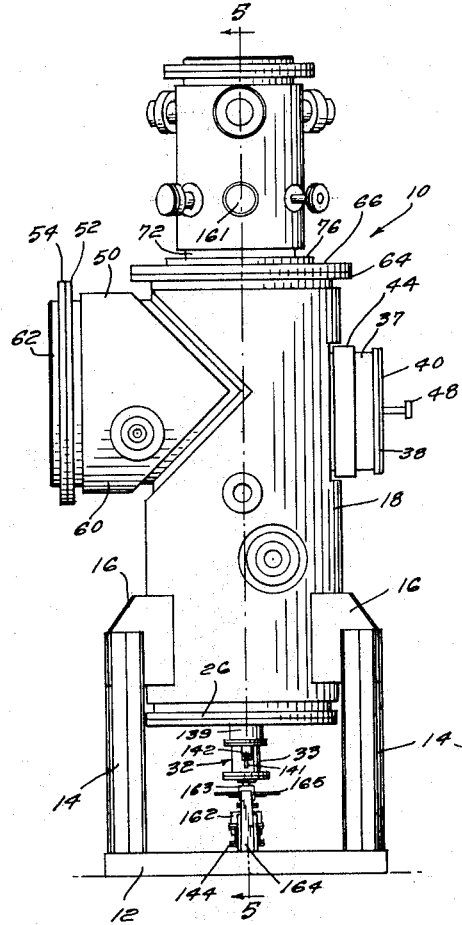
FIG. 1 is a front elevational view of the furnace construction embodied in the present invention.
Figure 2:
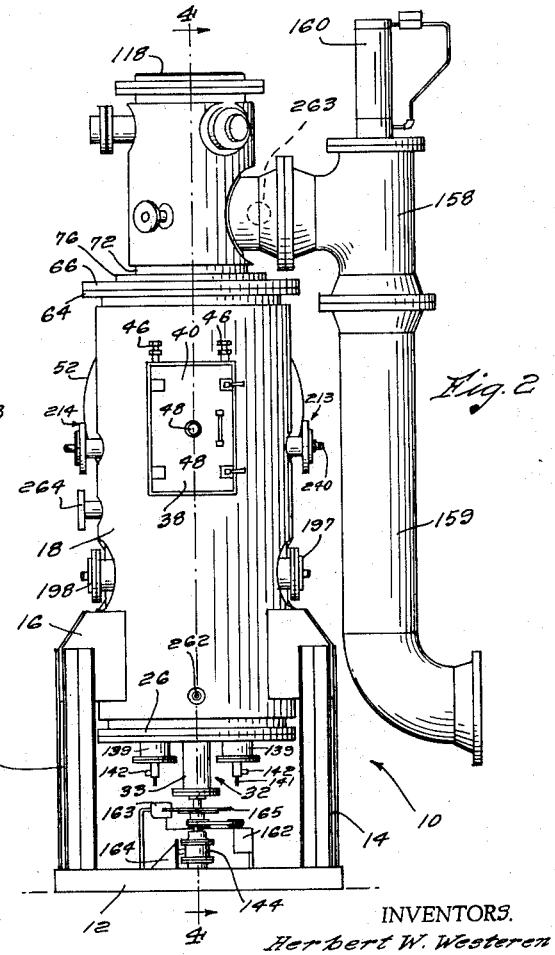
FIG. 2 is a side elevational view of the furnace construction embodied herein.

Referring now to the drawings and particularly to FIGS. 1, 2 and 3, the furnace construction embodied herein is illustrated and is generally indicated at 10. As shown, the furnace construction 10 is disposed in a generally vertical position, although it is understood that the concept of the invention may be incorporated in furnaces that are horizontal or otherwise located. The furnace construction 10 includes a generally square base 12 on which are mounted at the corners thereof standards 14 that may be formed in any configuration as desired depending upon the strength required. As shown in FIG. 3, the standards 14 have a generally T-shaped configuration and have plates 16 joined to the upper ends thereof, the plates 16 being welded to a lower portion of the furnace construction housing that is indicated at 18. The housing 18 is generally cylindrical in shape and has formed therein a work transfer chamber indicated at 20 in FIG. 4. Surrounding the lower portion of the housing 18 is a lower cooling jacket 22 while an upper cooling jacket 24 envelopes the upper portion of the housing. As will be described, the cooling jackets 22 and 24 cooperate with other cooling apparatus to prevent the furnace construction embodied herein from distorting due to the high temperatures generated therein. Secured to the lower end of the housing 18 is a flange 26 to which a plate 28 is joined by bolts 30. The plate 28 is formed with a central aperture in which a gland and bearing assembly generally indicated at 32 is fixed. The gland and bearing assembly 32 includes a sleeve 33 to which a flange 34 is fixed, the flange 34 having a plate 35 joined thereto by bolts 36. As will be described a bearing unit utilized to support an elevator device, is enclosed within the sleeve 33.

Figure 4:
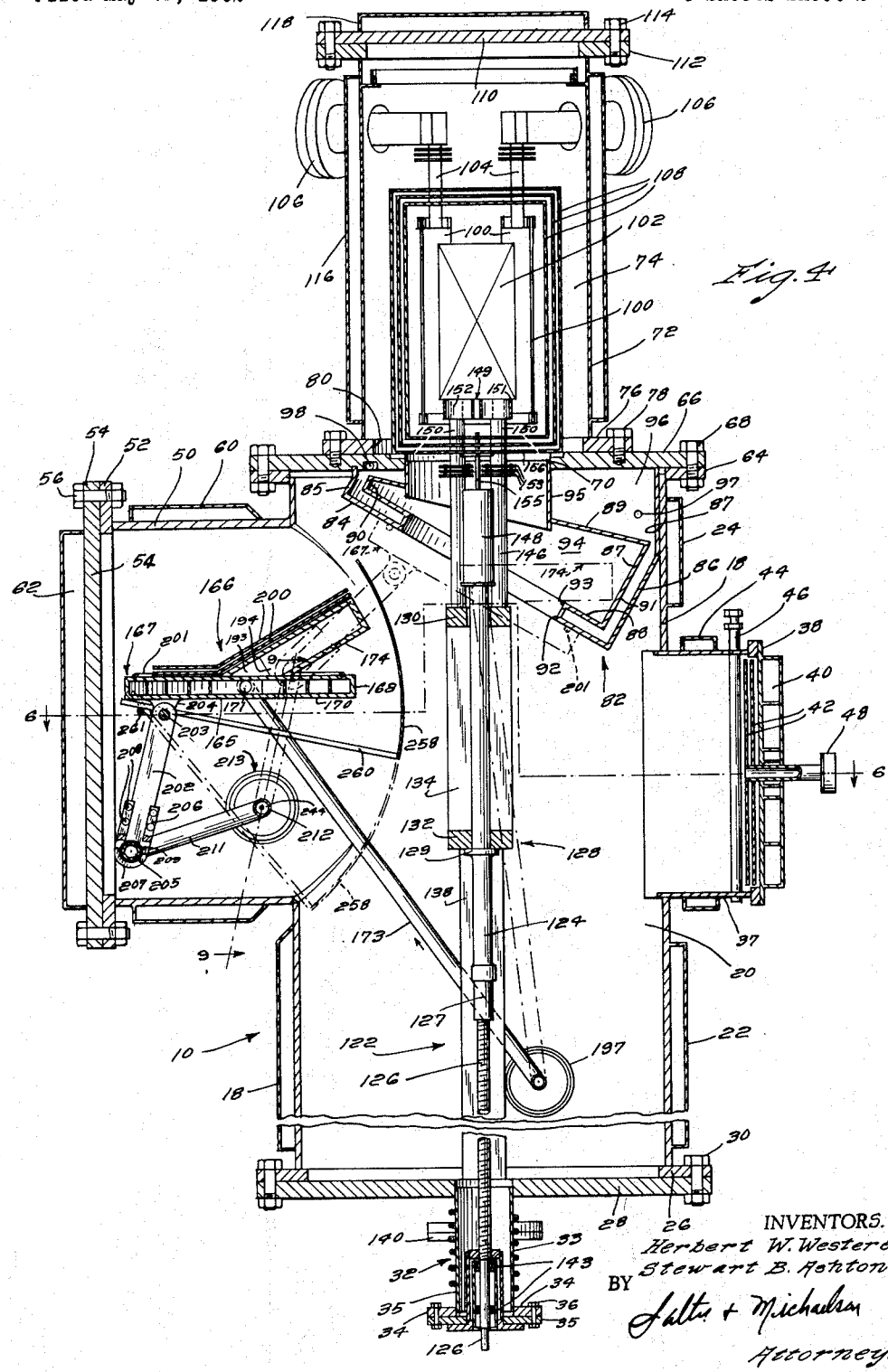
FIG. 4 is a vertical sectional view taken along lines 4—4 in FIG. 2.

Formed in the housing 18 intermediate the jackets 22 and 24 is an enlarged opening in which a work access member 37 is secured. Pivotally mounted on the member 37 is an access door 38 that is movable from the closed position shown in FIGS. 2 and 4 to an open position for permitting transfer of a work piece into and out of the work transfer chamber 20. The door 38 is also provided with an external cooling jacket 40 into which a cooling medium is introduced for circulation therein. Radiation shields 42 are further provided interiorly of the door 38 for shielding the door from the intense heat generated in the furnace. A water jacket 44 is also fixed to the member 37 and a cooling medium such as water is circulated therein for protecting the member 36 from heat distortion during the operation of the furnace. As shown in FIGS. 2 and 4, spaced tubular conduits 46 extend through the member 37 interiorly of the radiation shields 42 and are provided with inwardly directed slots therein. A gas such as argon circulates through the conduits 46 and is sprayed interiorly of the member 36 and acts to further protect the interior surface of the door 38 and the member 37. A sight port 48 extends through the door 38 and the radiation shields 42 and enables the operator to view the interior of the work transfer chamber 20 when the door 38 is closed.

Joined to the furnace housing 18 opposite the work access member 37 is an enlarged cylindrical member 50 that has an opening in the outer end and thereby defines an access port for the work transfer chamber 20. A flange 52 is joined to the cylindrical member 50 and a plate 54 is secured to the flange 52 by bolts 56 for sealing the open end of the cylindrical member. Cooling jackets 60 and 62 are mounted on the cylindrical member 50 and plate 56, respectively, and contain a cooling medium such as water that acts to prevent distortion thereof when the furnace construction is in operation.

Secured to the uppermost end of the housing 18 is a circular flange 64 on which a top plate 66 is mounted by bolts 68, a central opening 70 being formed in the top plate 66, the purpose of which will hereinafter be described. Mounted on the top plate 66 and forming a part of the furnace construction is an upper housing 72 that has a heat chamber 74 formed interiorly thereof. The upper housing 72 includes a lower flange 76 that is secured to the top plate 66 by bolts 78, the flange 76 also being provided with an opening 80 therein that communicates with the opening 70 formed in the top plate 66.

In order to provided communication between the heat chamber 74 and the work transfer chamber 20, a gate assembly generally indicated at 82 is provided and is located at the upper end of the work chamber 20 in communication with the openings 70 and 80. As shown in FIG. 4, the gate assembly 82 includes an outer shell defined by an inclined lower wall 84, shortened side wall 85, and continuous side walls 86 and 87, the side walls 85 and 87 being secured to the under surface of the top plate 66. Located interiorly of the outer shell is an inner shell defined by a lower inclined wall 88, and upper inclined wall 89, a shortened side wall 90 and a larger side wall 91. Openings 92 and 93 are formed in the walls 84 and 88 respectively thereby providing communication between the work transfer chamber 20 and the cavity in the inner shell of the gate assembly indicated at 94. Joined to the upper wall 89 of the inner shell is a tube 95, the lowermost end of which is inclined with respect to the horizontal and being generally aligned with the openings 92 and 93. The uppermost end of the tube 95 is secured within the opening 70 of the top plate 66 and communicates with the interior of the heat chamber 74. The inner and outer shells of the gate assembly 82 are effectively cooled by a cooling medium that is circulated therebetween, the spaced walls 84 and 88, 85 and 90, 86 and 91 and 89 and the underside of the plate 66 defining a cooling chamber indicated at 96. The cooling medium is introduced into the gate assembly cooling chamber 96 through an opening 97 formed therein and is discharged through an opening 98 that projects through a notch formed in the underside of the top plate 66.

In order to generate the heat necessary for the heat treatment of a work piece located in the heat chamber 74 a grid type of heating element generally indicated at 100 is provided, the heating element 100 substantially defining a cylindrical member into which a work piece indicated at 102 is adapted to be inserted. The heating element 100 is of the three-phase type and is therefore provided with three terminals indicated at 104, the terminals 104 have current externally applied thereto and being adapted to be water cooled in a manner described more fully in the patent to Westeren #2,971,039. Flanged pipes 106 are conveniently secured to the upper housing 72 and are adapted to enclose the current conducting members and the means for conveying the cooling medium to the terminal 104. As illustrated in FIG. 4 stacked radiation shields 108 surround the heating element 100 and act to radiate the heat emanating from the heating element grids and thereby cause the heat to be more evenly distributed throughout the heat chamber. Enclosing the upper end of the heat chamber 74 is a plate 110 that is secured to a flange 112 by bolts 114, the flange 112 being fixed to the uppermost end of the upper housing 72. Cooling jackets 116 and 118 are also provided for the upper housing 72, the jacket 116 enveloping the major portion of the upper housing 72, and the jacket 118 being secured to the upper surface of the plate 110.

In order to move the work piece 102 into and out of the heat chamber 74, a work transfer device generally indicated at 122 is provided and is adapted to be movable in a longitudinal direction with respect to the work transfer chamber 120 for elevating and lowering the work piece as required.

Figure 5:
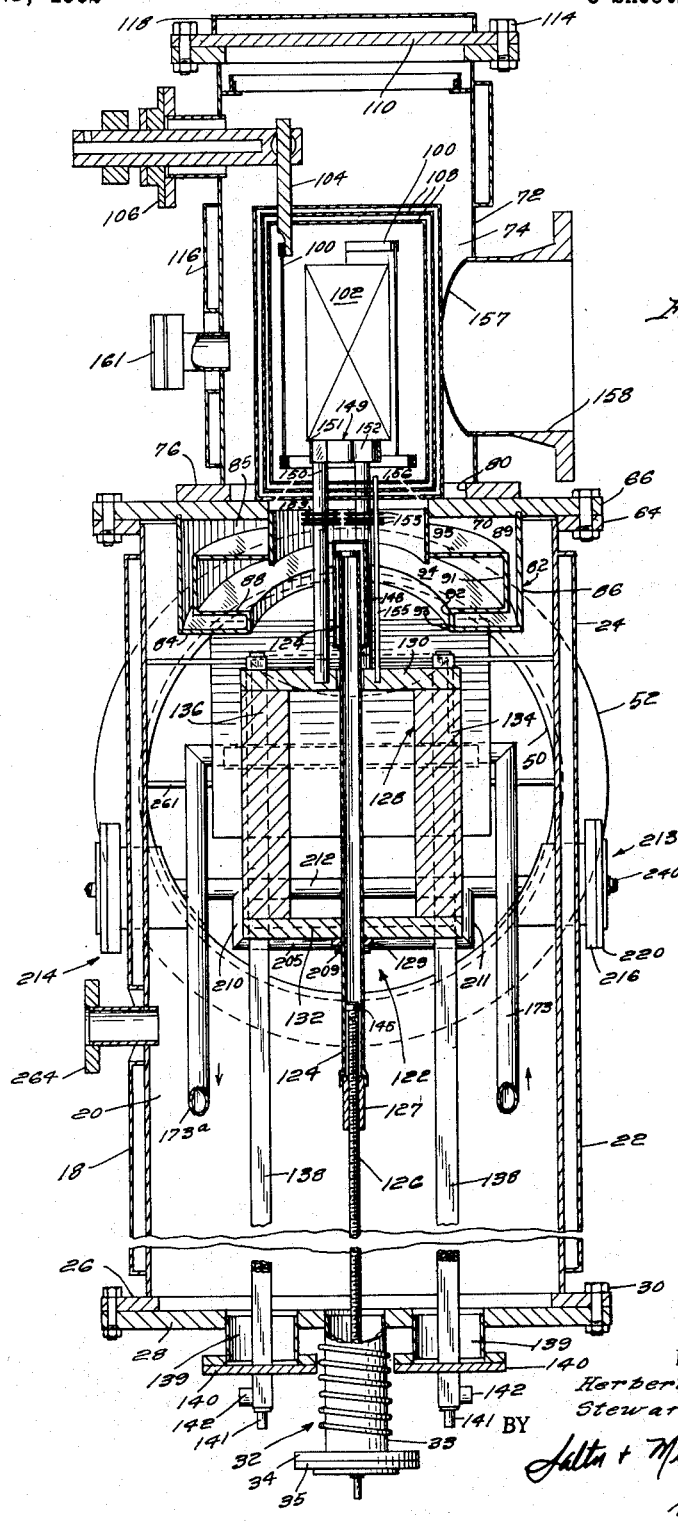
FIG. 5 is a vertical sectional view taken along lines 5—5 in FIG. 1.

Referring now to FIGS. 4 and 5, the work transfer device 122 is shown including an elongated tubular rod 124 into the lower end of which a spindle 126 extends. Joined to the tubular rod 124 for movement therewith and threadably engaging the spindle 126 is a nut 127. The tubular rod is also fixed by a collar 129 to a pedestal assembly generally indicated at 128 that is defined by end sections 130 and 132 and side members 134 and 136. It is seen that rotation of the spindle 126 will cause the nut 127 and tubular rod to move vertically which will result in a corresponding vertical movement of the pedestal assembly 128. In order to guide the pedestal assembly in the vertical movement thereof, pairs of guide members 138 are provided and are located in spaced vertical relation. The lowermost ends of the guides 138 extend through tubular sleeves 139 fixed in the lower plate 28 and through openings formed in a circular plate 140 in which they are secured. The upper portion of the guides 138 project through openings formed in end sections 130, 132 and thus act to properly guide the pedestal assembly in the vertical movement thereof. The guides 138 are tubular in construction and include inner tubular elements 141 that extend almost the length thereof. A cooling medium is introduced into the guides 138 through inlet pipes 142 located at the lower end thereof and spills into the tubular elements 141 at the upper ends thereof, the cooling medium being exhausted through the lower ends of the tubular elements 141.

The lowermost end of the spindle 126 extends through the gland and bearing assembly 32 and is supported for rotating movement by spaced bearings 143 as seen in FIG. 4. The lowermost end of the spindle 126 projects beyond the gland and bearing assembly 32 and may be secured to an air motor 144 (FIG. 1) or some other convenient source of power that is adapted to rotate the spindle at desired intervals. The upper end of the spindle 126 is disposed in a bearing 145 that is concealed within the tubular rod 124 and provides for rotation of the spindle 126 with respect thereto. A radiation reflector or shield 148 is also secured to the tubular rod 124 and envelopes the upper end thereof and spindle 126, thereby protecting these parts from the high temperatures in the furnace heat chamber 74, and further protecting the bearing 145 when the heated work is lowered from the heat chamber 74.

Figure 7:
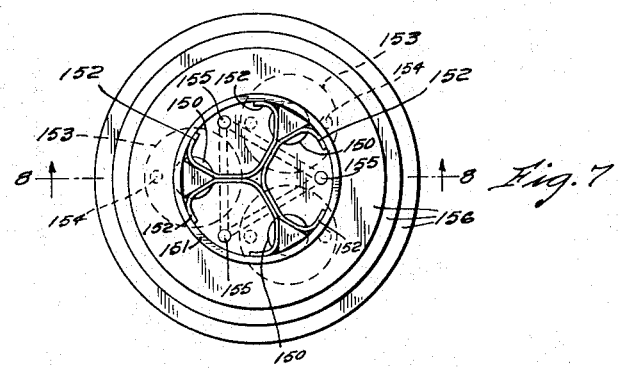
FIG. 7 is a top plan view of the work platform on which the work piece is mounted when it is to be inserted into the heat chamber of the furnace.
Figure 8:
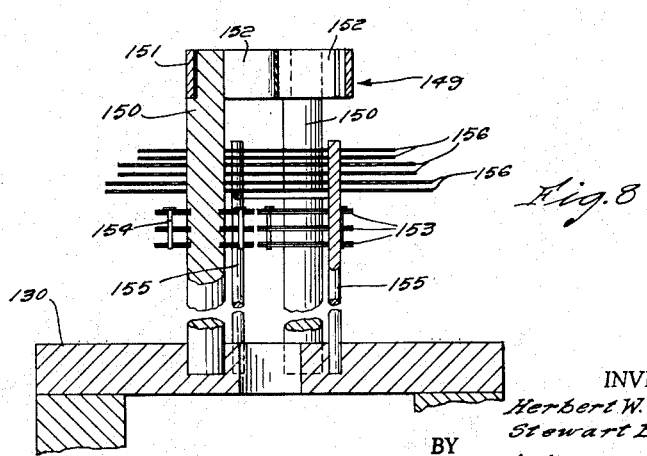
FIG. 8 is a sectional view taken along lines 8—8 in FIG. 7.

In order to support the work piece 102 a work holder generally indicated at 149 in FIG. 8 is provided and includes three spaced rods 150, the lower ends of which are fixed in the end section 130 of the work pedestal assembly 128. Secured in notches formed in the uppermost ends of the rods 150 is a work holding ring 151 in which three similarly formed work holding clamps 152 are located. Fixed to the rods 150 are a plurality of radiation baffle plates 153 that are disposed in spaced relation by spacers 154. Also mounted in the end section 130 of the work pedestal assembly 128 are three small rods 155, each of which is located intermediate two of the larger rods 150 (FIG. 7). As shown in FIG. 8, a plurality of radiation plates 156 are secured to the small rods 155 and are provided with suitable openings for accommodating the rods 150. The radiation plates 156 cooperate with the radiation shields 108 (FIG. 4) to evenly distribute the heat in the heat chamber 74 when the work piece 102 is located in the heat chamber on the work holder 149.

In order to evacuate the heat chamber 74 during the operation of the furnace a vacuum exhaust port 157 (FIG. 5) is formed in the upper housing 72 and communicates with a vacuum exhaust pipe 158 that is connected to a conduit 159 (FIG. 2) that, in turn, is adapted to be interconnected to a suitable vacuum pump (not shown). The vaccum system is controlled by a suitable control valve 160, as is well known in the art. As shown in FIG. 5, a sight port 161 extends through the wall of the upper housing and provides for viewing of the work piece 102 during the heat treating operation.

As described above an air motor 144 is operatively connected to the spindle 126 and is adapted to vertically move the work pedestal assembly for elevating the work piece 102 into the heat chamber 74 or for removing it therefrom. Since the air motor 144 will normally be operated by compressed air supplied by an externally located air compressor, provision must be made for insuring that the air motor will correctly locate the work pedestal assembly even if the line pressure to the air motor is momentarily decreased for some reason. For this purpose a counter 162 and a brake 163 are provided and are employed in conjunction with the air motor 144. As shown in FIG. 1, the counter 162 and brake 163 are mounted on a platform 164 located on the base 12, the counter 162 being driven by the air motor 144 through a suitable pulley and belt arrangement. A disc 165 is secured to the air motor shaft and extends between the jaws of the brake 163 and is adapted to be engaged by the brake for stopping the rotation of the spindle 126. When the work piece is being moved into or out of the heat chamber by the work pedestal assembly 128, if the line pressure to the air motor 144 drops, then the reduction in pressure would normally result in incomplete movement of the work pedestal assembly. However, the counter 162 is arranged to count the number of rotations of the spindle 126 and operatively controls the air motor 144 so that it will continue to operate until the required number of rotations of the spindle is produced for locating the work pedestal assembly 128 in its proper position in the heat chamber 74 or opposite the door 38. The counter 162 also controls the operation of the brake 163 to stop the spindle 126 after it has been rotated the predetermined number of rotations for properly locating the work piece.

Although not illustrated herein, a control cam assembly is employed with the counter and is adapted to control the operation of solenoids that, in turn, control the air motor 144 and brake 163.

Figure 10:
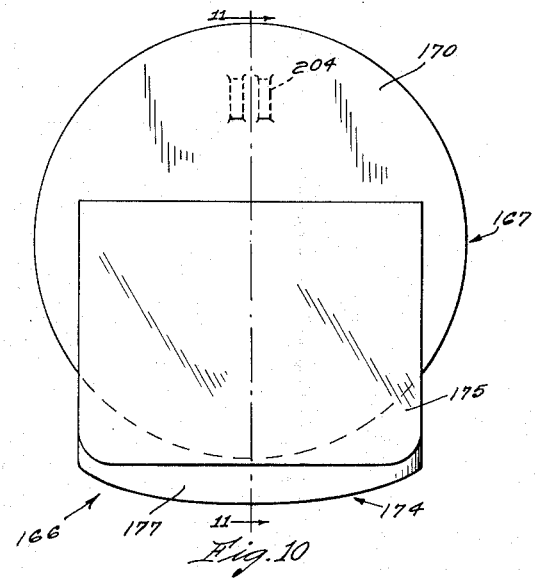
FIG. 10 is a front elevational view of the door assembly that defines the sealing device of the present invention.
Figure 11:
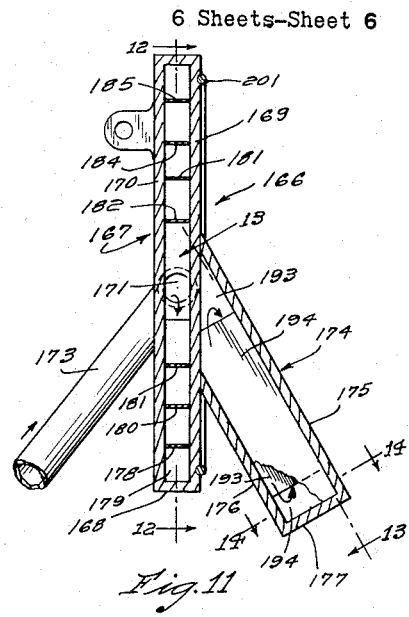
FIG. 11 is a sectional view taken along lines 11—11 in FIG. 10.
Figure 12:
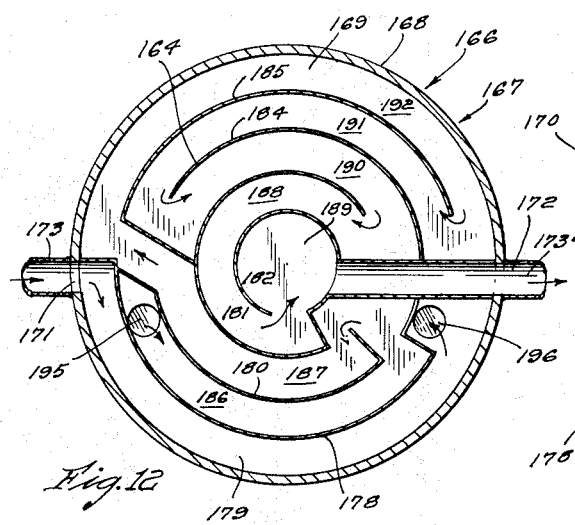
FIG. 12 is a sectional view taken along lines 12—12 in FIG. 11.

As discussed hereinabove, the heat chamber 74 is maintained at a relatively high temperature and at vacuum pressure and accordingly it is desirable to maintain these interior conditions of the heat chamber 74 when a work piece is not being heat treated therein. For this purpose a sealing device is provided that cooperates with the gate assembly to seal the interior of the heat chamber 74 prior to the introduction of a work piece therein. Referring now to FIGS. 4 and 10-14, the sealing device is shown as a door assembly generally indicated at 166 and is adapted to be moved into sealing engagement with the gate assembly 82 as will be described. The door assembly 166 includes a main body portion 167 that is substantially cylindrical and that is defined by an annular wall 168 to the ends of which are joined a front wall 169 and a rear wall 170. Joined to opposite sides of the annular wall 168 and communicating with the interior of the main body portion through inlet and exhaust ports 171 and 172 respectively are tubular pivot rods 173 and 173a, the operation and description of which will be more fully described hereinafter. Fixed to the front wall 169 of the main body portion 167 is a forward portion 174 that is disposed in angular relation with respect to the front wall 169. The forward portion 174 projects outwardly of the front wall 169 and is hollow in construction, being defined by a flat wall 175, an arcuate shaped wall 176 and an outer wall 177. Both the main body portion 167 and the forward portion 174 of the door assembly have a cooling medium circulating continuously therethrough and for this purpose are formed with a baffle construction that defines a plurality of cooling channels. As shown in FIG. 10, the main body portion 167 has a baffle 178 spaced from the inner end of the annular wall 168 to define a channel 179 that communicates with the cooling medium inlet port 171. Formed concentric with the baffle 178 are baffles 180, 181, 182, 184 and 185. These baffles are constructed and arranged to define channels 186, 187, 188, central chamber 189 and channels 190, 191 and 192. As will be described, the several channels have continuous communication with each other to provide for continuous circulation of the cooling fluid.

Figure 13:
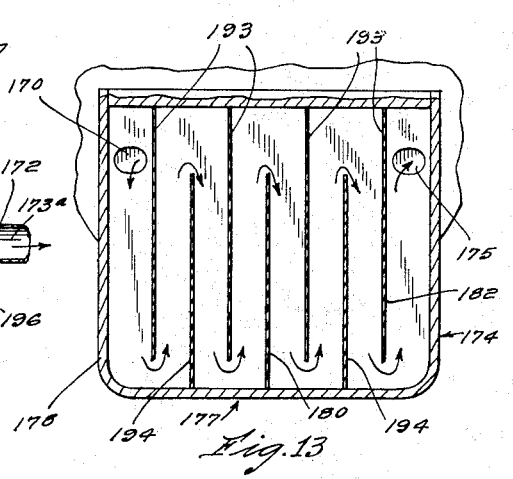
FIG. 13 is a sectional view taken along lines 13—13 in FIG. 11.
Figure 14:
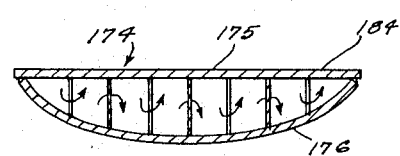
FIG. 14 is a sectional view taken along lines 14—14 in FIG. 11.

Referring now to FIG. 13, the forward portion 174 of the door assembly is shown formed with staggered baffles 193, 194 that define a series of channels that provide for a tortuous path of the cooling fluid as it is circulated therethrough. A port 196 is formed in the channel 179 of the main body portion 167 and communicates with the interior of the forward portion 174 adjacent one side thereof. A second port 195 is formed in the channel 186 of the main body portion and communicates with the interior of the forward portion 174 adjacent the other side thereof. The cooling fluid for the door assembly 166 is introduced therein through the tubular pivot rod 173 by way of a gland and bearing assembly 197 and is discharged from the door assembly through the tubular rod 173a. A gland and bearing assembly 198 communicating with the pivot rod 173a through a cross rod, to be described, provides for discharge of the cooling fluid from the tubular pivot rod 173a. The tubular cross rod, to be described, interconnects the pivot rods 173, 173a and also provides for continuous circulation of the cooling fluid through the gland and bearing assemblies 197, 198. It is understood that any suitable pumping means may be provided for continuously circulating the cooling fluid through the pivot rods 173, 173a and the door assembly 166.

Referring again to FIGS. 12 and 13, the cooling fluid is shown being introduced into the main body portion 167 of the door assembly through the tubular pivot rod 173 and port 171. The fluid circulates through the channel 179 and is then introduced into the interior of the forward portion 174 by way of port 196. After moving through the circuitous path defined by the baffles 193 and 194, the cooling fluid discharges from the forward portion 174 into the channel 186 of the main body portion through the port 195. The fluid then follows the path indicated by the arrows in FIG. 12 circulating through channels 187, 192, 191, 190, 188 and into the central chamber 189. The cooling fluid is discharged from the door assembly through the port 172 and is carried by the tubular rod 173a to the gland and bearing assembly 198 for discharge to the pumping unit for recirculation through the system.

The door assembly 166 is adapted to be moved into sealing engagement with the gate assembly 82, the forward portion 174 moving within the cavity 94 to act as a buffer for the main body portion 167 against the intense heat generated within the heat chamber 74. Heat shields 200 are also provided for protecting the door assembly and are bent to conform to the wall 175 of the forward portion 174 and the outer part of the wall 169 of the main body portion 167.

When the door assembly 166 is moved into the sealing position, the wall 169 engages the wall 84 of the gate assembly 82 in flush relation and in order to provide a positive seal, an O-ring 201 is located in an annular groove formed in the wall 169 and is adapted to be compressed between the walls 169 and 84.

Figure 9:
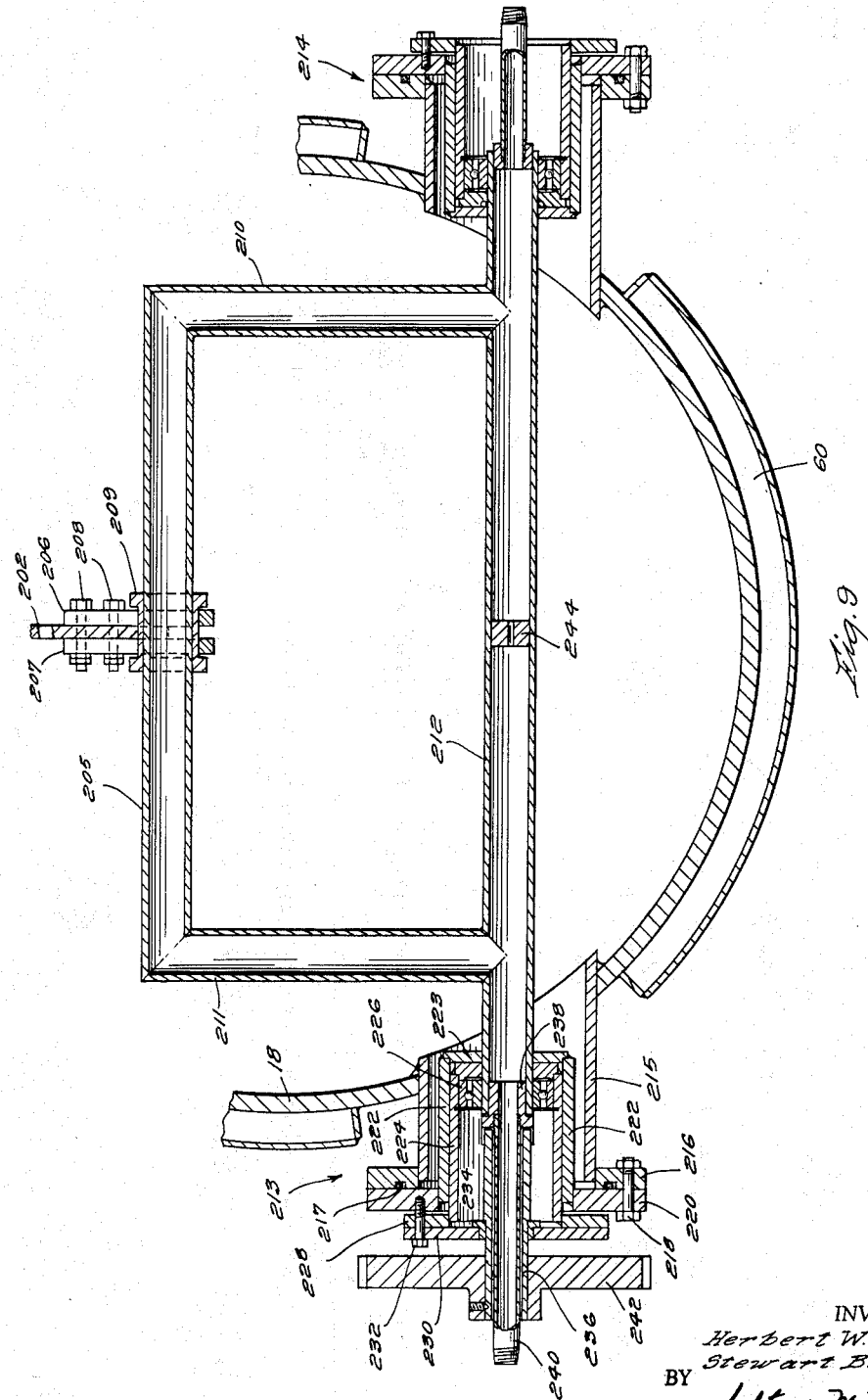
FIG. 9 is a sectional view taken along lines 9—9 in FIG. 4.

In order to move the door assembly 166 into sealing engagement with the gate assembly 82, a linkage assembly is provided and includes a link 202 that is pivotally connected by a bolt 203 to a lug 204 that is secured to the wall 170 of the door assembly main body portion 167. Referring particularly to FIG. 9, the link 202 is shown secured to a tubular member 205 by two U-shaped brackets 206 and 207 through which the bolts 208 extend. The brackets 206, 207 envelope a bushing 209 that provides for pivotal movement of the link 202 with respect to the tubular member 205. Joined to the tubular member 205 are opposed parallel legs 210 and 211 that are also tubular in construction and that are joined to a tubular shaft 212. The tubular shaft 212 cooperates with the tubular member 205 to define a crank shaft like arrangement which is adapted to impart the necessary movement to the door assembly 166. The shaft 212 is not only rotated to move the door assembly but is also tubular in construction to provide for the circulation of a cooling fluid therein. In order to mount the tubular shaft 212 in the wall of the housing 18, gland and bearing assemblies 213, 214 are provided and are located in suitable openings formed in the housing wall. The gland and bearing assemblies 213, 214 are substantially similar in construction and therefore only assembly 213 will be described in detail herein. The bearing assembly 213 includes tubular casing 215 that projects through a suitable opening formed in the housing and is sealed therein by welding or the like As seen in FIG. 9, the inner tubular casing 215 is shaped to conform to the arcuate configuration of the side wall of the housing 18 A flange 216 is secured to the outer end of the casing 215, the flange 216 including an annular groove in which an O-ring 217 is disposed. Secured to the flange 216 by bolts 218 is flange 220 that is fixed to an outer gland tube 222. An inner cap 223 is secured to the gland tube 222 and defines a cap element therewith. A bearing cup 224 is slidably received within the gland tube 222 and receives a bearing 226 therein through which the outermost end of the tubular shaft 212 projects. The bearing cup 224 has a flange 228 joined thereto to which a plate 230 is secured by bolts 232. Extending through a bushing 234 fixed in a central opening in the plate 230 is a sleeve 236 the inner end of which is interconnected to the shaft 212 through a coupling 238. A cooling fluid inlet pipe 240 projects through the sleeve 236 and is fixed in the assembly by threadable engagement with the coupling 238. A gear 242 is secured to the sleeve 236 and is adapted to impart rotation thereto for producing a corresponding rotation of the shaft 212. As mentioned above the gland and bearing assembly 214 is generally similar to assembly 213 and differs therefrom only in that the sleeve 236 and gear 242 are eliminated.

A cooling fluid is normally circulated through the shaft 212 and is introduced therein through the pipe 240, the cooling fluid thus being continuously circulated through the shaft 212, the parallel tubular legs 210, 211 and the tubular member 205 on which the link 202 is pivotally mounted. Since gland and bearing assembly 214 is constructed in a manner similar to that described in connection with gland and bearing assembly 213, the cooling fluid will circulate continuously through the assemblies 213, 214 for effectively cooling the parts associated therewith and the parts of the linkage assembly. A restriction 244 may be disposed in the tubular shaft intermediate the tubular legs 210, 211 and thereby promotes continuous flow of the cooling fluid through the legs 210, 211 and tubular member 205. It is understood that any suitable drive means may be interconnected to the gear 242 for imparting the necessary rotation thereof when it is desired to move door assembly 160 to and from the sealing position thereof.

Figure 6:
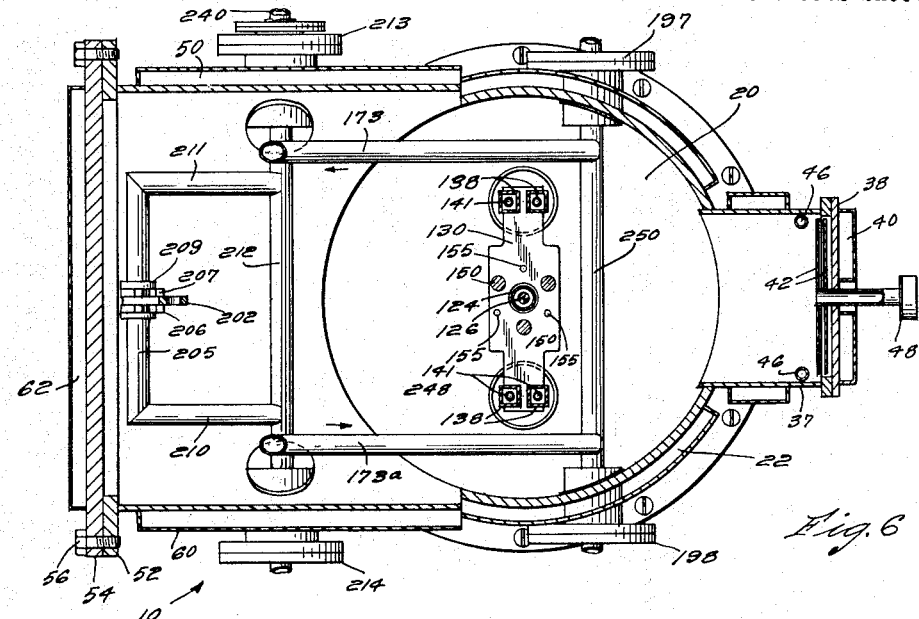
FIG. 6 is a sectional view taken along lines 6—6 in FIG. 4.

The door assembly 160 is adapted to be moved through a fixed path so that it will be brought into sealing engagement with the gate assembly 82 for closing off communication between the heat chamber 74 and the work transfer chamber 20 and for this purpose the tubular pivot rods 173, 173a are provided. As described above and shown in FIGS. 4, 5 and 6, the pivot rods 173, 173a are tubular in construction and form part of the cooling system for the door assembly 160. The circulating medium is thus transferred through the pivot rod 173 and is circulated through the door assembly 160 and then exhausted through the other pivot rod 173a. The pivot rods 173, 173a are joined to a cross rod 250 that is also tubular in construction. The outermost ends of the cross rod 250 are mounted for rotation in the gland and bearing assemblies 197 and 198, which are essentially similar in construction to the gland and bearing assembly 214 illustrated in FIG. 9. The cooling medium is thus introduced through either gland and bearing assembly 197 or 198 and is circulated through the pivot rods 173, 173a as described above for cooling the door assembly 166. It is understood that the cross rod 250 defines the axis of rotation for the pivot rods and is rotated as the door assembly is moved by the linkage assembly.

The pivot rods 173, 173a are also of a predetermined length so that pivotal movement thereof will positively move the door assembly 166 through a fixed path to the sealing position in engagement with the gate assembly 82.

After the work piece 102 has been withdrawn from the heat chamber 74 by the work transfer device 122, it clears the gate assembly 82 and is moved to the position opposite the loading door 38. Since the interior of the heat chamber 74 is now exposed it is desirable to seal communication between the work transfer chamber 20 and the heat chamber 74 so as to maintain the interior conditions of the heat chamber. Upon actuation of the linkage assembly which causes the link 202 to move the door assembly 166, the door assembly will follow the path as determined by the radius of the pivot rods 173, 173a. As the door assembly moves upwardly and approaches the gate assembly 82, the forward portion 174 slides through the openings 92 and 93, the arcuate design of the wall 176 of the forward portion providing for clearing of the sides of the openings. The wall 169 of the main body portion 162 of the door assembly 166 is then moved into flush engagement with the wall 84 of the gate assembly 82, the O-ring 201, located in the annular groove in the wall 169 engaging the wall 89 in sealing engagement therewith, thereby sealing the interior of the heat chamber 74. When a work piece is to be inserted into the heat chamber 74, the door assembly 166 will be withdrawn to the position shown in full lines in FIG. 4 by the reverse movement of that just described.

When the door assembly 166 is moved to the open position thereof as seen in full lines in FIG. 4, it is necessary to protect the O-ring 201 from the heat emanating from the heat chamber 74. For this purpose, a retractable shield 258 is provided. The shield 258 is formed in a generally arcuate configuration and overlies the inner ends of the main body portion and forward portion of the door assembly, that is, those portions that are located more closely to the heat chamber 74 when the door assembly is located in the position shown in full lines in FIG. 4. The shield is secured to a rod 260, the outer end of which is trapped between the outer corner of the wall 170 and a pivot point 261. It is seen that the shield is normally located in the dotted line position as seen in FIG. 4, and is actuated upon movement of the door to the full line position due to the engagement of the outer corner of the wall 170 with the outer end of the rod 160. Thus, when the door assembly is to be moved to the sealing position, the shield 258 will be swung downwardly to the dotted line position shown in FIG. 4, to remove the shield 258 from the path of movement of the door assembly 166 and thereby enabling the door assembly to be moved to the sealing position thereof. When the door assembly is retracted to the open or unsealed position thereof, the rod 260 is pivoted to move the shield to the overlying position with respect to the inner portions of the door assembly, thereby protecting these portions and particularly the O-ring 201 from distortion due to heat.

Although not critical to the operation of the furnace construction as described herein, it is sometimes desirable to introduce a hydrogen or nitrogen atmosphere into the interior of the housing 18. For this purpose, a port 262 (FIG. 2) may be provided in the housing 18 for receiving a suitable pipe connected to a source of nitrogen or hydrogen. A hydrogen atmosphere may also be introduced into the heat chamber 74 instead of utilizing a vacuum pressure and for this purpose a port 263 is provided as seen in FIG. 2. Additional cooling of the work transfer chamber 20 may be accomplished by introducing an argon atmosphere therein. A port 264 is provided for this purpose as also seen in FIG. 2.

In operation of the furnace construction embodied in the present invention, the work piece 102 is normally placed on the work holder 149 when the work holder is located opposite the door 38. Since extremely high temperatures are present in the work transfer chamber, it may be required to utilize aritficial hands in placing the work piece 102 on the work holder 149. After the work piece has been placed securely in position on the work holder, the air motor 144 is actuated to cause the pedestal assembly to be elevated. The work piece is then moved through the openings in the gate assembly 82 and into the heat chamber 74, the proper positioning within the heating element 100 being assured by the operation of the counter 162 and the brake 163. With the work piece 102 in the heat chamber 74, the door assembly is located in the lower position as shown in full lines in FIG. 4, the shield 258 having been moved to the protective position thereof. Upon completion of the heating cycle, the air motor 144 is actuated in the reverse direction and causes the work pedestal to be lowered, thereby withdrawing the work holder 149 and work piece thereon from the heat chamber 74. The operation of the air motor 144 is controlled to locate the work piece directly opposite the door 38 and the door 38 is then opened for removal of the treated work piece, from the work transfer chamber.

After the work piece has cleared the gate assembly 82, the gear 242 is rotated by suitable means for actuating the linkage assembly to move the door assembly to the sealing position in engagement with the gate assembly 82. When a new work piece is to be heat treated, the door assembly 166 is withdrawn from the sealing position to permit the work holder 149 to move the new work piece into the heat chamber 74.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a furnace construction for use in the heat treatment of a metal work piece, a housing, a work transfer chamber formed in said housing and having a work transfer member mounted for reciprocation therein on which the work piece is supported, a heat chamber located adjacent said work transfer chamber, means for maintaining the heat chamber at relatively high temperature and vacuum, means for sealing said heat chamber for maintaining the interior conditions therein after said work transfer member has withdrawn the work piece therefrom, said sealing means including a gate assembly that defines the inner portion of said heat chamber and that includes an access opening therein, said sealing means further including a door that is movable into sealing engagement with said gate assembly after the work piece has been withdrawn from said heat chamber through said opening, said door including a plurality of interiorly formed channels that define a path through which a cooling fluid is adapted to be circulated, and means for guiding movement of said door between the sealing and unsealing positions, said guiding means including tubular rods that communicate with the cooling path in said door and with a source of cooling fluid for directing said cooling fluid into the cooling path.

2. In a furnace construction for use in the heat treatment of a metal work piece, a housing, a work transfer chamber formed in said housing and having a work transfer member mounted for reciprocation therein on which the work piece is supported, a heat chamber located adjacent said work transfer chamber, means for maintaining the heat chamber at relatively high temperature and vacuum, means for sealing said heat chamber for maintaining the interior conditions therein after said work transfer member has withdrawn the work piece therefrom, said sealing means including a gate assembly that defines the inner portion of said heat chamber and that includes an access opening therein, said sealing means further including a door that is movable into sealing engagement with said gate assembly after the work piece has been withdrawn from said heat chamber through said opening, and means operatively connected to said door for moving said door into and out of the sealing position thereof, said moving means including a link that is interconnected to a crank shaft assembly, the crank shaft assembly including a tubular shaft that is journalled for roation in said housing and that communicates with a source of cooling fluid, said cooling fluid circulating through said tubular shaft and crank shaft assembly for effecting the cooling thereof.

3. In a furnace construction for use in the heat treatment of a metal work piece, a housing, a work transfer chamber formed in said housing and having a work transfer member mounted for reciprocation therein on which the work piece is supported, a heat chamber located adjacent said work transfer chamber, means for maintaining the heat chamber at relatively high temperature and vacuum, means for sealing said heat chamber for maintaining the interior conditions therein after said work transfer member has withdrawn the work piece therefrom, said sealing means including a gate assembly that defines the inner portion of said heat chamber and that includes an access opening therein, said sealing means further including a door that is movable into sealing engagement with said gate assembly after the work piece has been withdrawn from said heat chamber through said opening, means for moving said door into sealing engagement with said gate assembly and for withdrawing said door from the sealing position thereof, said moving means including a linkage assembly interconnected to said door, means associated with said linkage assembly for imparting a driving movement thereto for moving said door, and means journalled for rotation in said housing and connected to said door for guiding said door through a fixed path of movement thereof, and a shield operatively connected to said linkage assembly and responsive to the operation thereof for movement to a shielding position with respect to said door when said door is moved to the unsealing position thereof.

4. In a furnace construction for use in the heat treatment of a work piece, a housing having a work transfer chamber formed in one portion thereof and a heat chamber formed in another portion thereof and in adjacent relation to said work transfer chamber, said heat chamber being normally maintained at a vacuum pressure and at a relatively high temperature, means for transferring the work piece from said work transfer chamber to said heat chamber for the heat treatment thereof, and for removing said work piece from said heat chamber after the heat treatment thereof, means for sealing said heat chamber upon withdrawal of said work piece from said heat chamber by said transferring means, thereby maintaining the relatively high temperature and vacuum pressure therein, means for cooling said sealing means including a plurality of cooling channels formed in said sealing means, and tubular guide means for guiding said sealing means in the movement thereof and communicating with said cooling channels for defining a continuous flow cooling fluid circulating system therewith.

5. In a furnace construction, a work transfer chamber, an independent heat chamber located adjacent said work transfer chamber and being adapted to communicate therewith, said heat chamber receiving a work piece therein for the heat treatment thereof, means for maintaining said heat chamber substantially at a predetermined temperature and pressure, including means for sealing communication between said chambers when a work piece is not located in said heat chamber, said sealing means including a movable door assembly having a main body portion and an outwardly projecting portion joined to said main body portion, said main body portion and outwardly projecting portion being formed with a plurality of interior channels that define a continuous cooling path through which a cooling fluid is circulated, and means joined to said door assembly for guiding said door assembly during the movement thereof, said guiding means including tubular rods that are journalled for pivotal movement in a wall of said furnace construction and that communicate with said channels and a source of said cooling fluid for directing said cooling fluid through said door assembly in a continuous flow.

6. In a furnace construction, a work transfer chamber, a heat chamber located adjacent said work transfer chamber and in communication therewith, said heat chamber being adapted to heat treat a work piece therein, means for sealing communication between said chambers and for maintaining the interior conditions of said heat chamber after a heat treated work piece has been withdrawn therefrom and prior to insertion of a work piece to be heat treated therein, and means for moving said sealing means to and from the sealing position thereof, said moving means including an operating linkage operatively connected to said sealing means for effecting the movement thereof, and a pivot assembly joined to said sealing means and controlling the path of the movement thereof, said pivot assembly including a tubular fluid conducting member that communicates with said sealing means for continuously circulating a cooling fluid therethrough.

7. In a furnace construction as set forth in claim 4, said heat chamber including a gate assembly in which a cavity is formed, said cavity communicating with said work transfer chamber through an opening formed in said gate assembly, said sealing means including a door having an offset portion that projects through said opening into said cavity to form a radiation shield, the remaining portion of said door seating around said opening in engagement with said gate assembly to effectively seal said opening against any substantial loss of heat or vacuum pressure from said heat chamber.

8. In a furnace construction as set forth in claim 4, said sealing means including a door, means for moving said door to the sealed and unsealed positions including a linkage mechanism that is operatively connected to said door and is responsive to an external power source for effecting movement thereof, said guide means defining a pivot connection that is secured to said door and to a fixed point on said housing, wherein said door is caused to move in a predetermined path as determined by said pivot connection when said linkage mechanism is actuated by said power source.

9. In a furnace construction as set forth in claim 8, a heat shield operatively connected to said door and responsive to the movement thereof for movement into shielding relation between said door and said opening when said heat chamber is open during movement of said work piece into or out of said heat chamber.

10. In a furnace construction as set forth in claim 6, said tubular fluid conducting member being journaled for rotation in a gland and bearing assembly that is mounted in a wall of said furnace construction, said gland and bearing assembly including means for sealing said member in said wall and further including means for mounting said member for rotation.

11. In a furnace construction for use in the heat treatment of a metal work piece, a housing including a work transfer chamber and a heat chamber communicating with said work transfer chamber, means in said heat chamber for heat treating a work piece therein, a gate assembly located in said housing between said work transfer chamber and said heat chamber and having an opening formed therein through which said work piece is moved for placement in said heat chamber, a work transfer member located in said housing and mounted for reciprocation therein for moving said work piece inwardly and outwardly of said heat chamber, a door located in said housing and mounted for movement in an arcuate path for sealing said opening after the work transfer member has moved the work piece out of said heat chamber, wherein the temperature and pressure conditions in said heat chamber are maintained, an operating linkage operatively connected to said door for effecting the movement thereof, and a pivot assembly joined to said door and controlling the path of pivotal movement thereof.

12. In a furnace construction as set forth in claim 11, said door including interior cooling channels through which a cooling fluid is circulated, and said operating linkage including cooling passages that communicate with said cooling channels to define a cooling path therewith through which the cooling fluid is continuously circulated.

13. In a furnace construction as set forth in claim 11, said opening in said gate assembly being inclined with respect to the longitudinal axis of said housing and said work transfer member, the inclination of said opening providing for receiving said door after movement through its arcuate path in sealing relation therewith.

14. In a furnace construction for use in the heat treatment of a metal work piece, a housing, a work transfer chamber formed in said housing, a work transfer member on which the work piece is supported mounted in said chamber for reciprocation therein, a heat chamber located in said housing adjacent said work transfer chamber, means for maintaining the heat chamber at a relatively high temperature and vacuum, a door for sealing said heat chamber for maintaining the interior conditions therein after said work transfer member has withdrawn the work piece therefrom, means connected to said door for moving said door through an arcuate path into the sealing position thereof, said moving means including passages formed therein through which a cooling fluid circulates that provides for the cooling of said moving means, and channel means formed in said door through which a cooling fluid is circulated.

15. In a furnace construction for use in the heat treatment of a metal work piece, a housing including a work transfer chamber and a heat chamber communicating with said work transfer chamber, means in said heat chamber for heat treating a work piece therein, a gate assembly located in said housing between said work transfer chamber and said heat chamber and having an opening formed therein through which said work piece is moved for placement in said heat chamber, a work transfer member located in said housing and mounted for reciprocation therein for moving said work piece inwardly and outwardly of said heat chamber, a door located in said housing and mounted for movement in an arcuate path for sealing said opening after the work transfer member has moved the work piece out of said heat chamber, wherein the temperature and pressure conditions in said heat chamber are maintained, and an operating linkage operatively connected to said door for effecting the movement thereof in said arcuate path when said door is moved to the sealing position thereof in said opening.

References Cited in the file of this patent

UNITED STATES PATENTS

| | | |
|---|---|---|
| 2,726,278 | Southern | Dec. 6, 1955 |
| 2,854,228 | Franks et al. | Sept. 30, 1958 |
| 2,966,537 | Witucki et al. | Dec. 27, 1960 |
| 2,971,039 | Westeren | Feb. 7, 1961 |